United States Patent Office 3,022,117
Patented Feb. 20, 1962

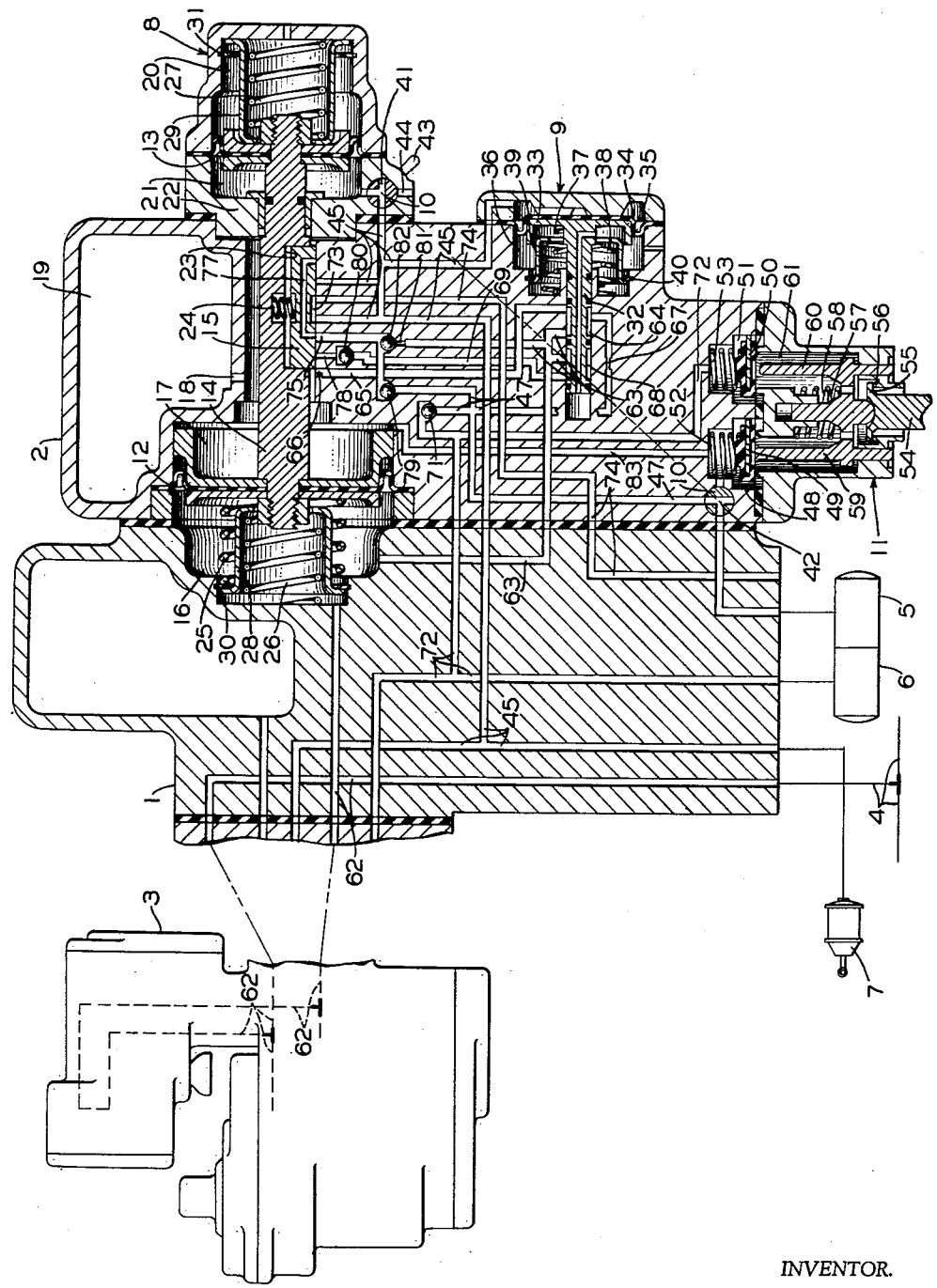

3,022,117
BRAKE CONTROL APPARATUS WITH QUICK SERVICE MEANS
Ellis E. Hewitt, Ruffsdale, Pa., assignor to Westinghouse Air Brake Company, Wilmerding, Pa., a corporation of Pennsylvania
Filed Jan. 20, 1960, Ser. No. 3,577
6 Claims. (Cl. 303—39)

This invention relates to fluid pressure brake apparatus for railway cars and the like.

Practically all freight cars now in use in the United States are provided with direct-release type brake controlling valves, such as the "AB" or "K" valve, which respond to a slight increase in pressure of fluid in a brake pipe to effect a complete or direct release of brakes. Such direct-release type valves are desirable to assure more prompt release of brakes on long freight trains. On the other hand, on short passenger trains, it is proposed to use graduated-release type brake controlling valves, such as the "No. 26," which operate to provide in a brake cylinder fluid at a pressure corresponding to the magnitude of the differential between brake pipe pressure and the pressure of fluid in a control reservoir or volume containing fluid at substantially the normal full charge value of brake pipe pressure. These graduated-release type valves will thus operate to release brakes to any desired degree corresponding to the extent brake pipe pressure is increased toward equality with the pressure in the volume or control reservoir, thereby permitting graduated release of brake cylinder pressure; and they will also operate to maintain the brake cylinder against leakage by connecting the brake cylinder to a source of pressure fluid if brake cylinder pressure should tend to drop below that corresponding to the preselected magnitude of such differential.

It is desirable that a brake apparatus be provided which can be readily conditioned to operate on the direct-release or the graduated-release principle, so that cars equipped with such apparatus may, for example, be entrained selectively with other cars having either direct-release or graduated-release type brake apparatus.

The object of the invention is to provide a brake apparatus of the above type embodying means operative to effect a relatively fast rate of quick service reduction in brake pipe pressure during the initial phase of brake application and until brake cylinder pressure exceeds a chosen value and effect a slower rate of so-called "continuous" quick service reduction in brake pipe pressure thereafter and also during brake applications of increased degree whenever and so long as the service valve device is in a brake-applying or service position and irrespective of brake cylinder pressure.

According to this object, the brake apparatus embodying the invention comprises a service valve device controlled by brake pipe pressure and pressure of fluid in a chamber opposing pressure of fluid in a volume or control reservoir. For graduated release operation, a selector valve is positioned to connect the chamber to the brake cylinder and cut off the volume from an auxiliary reservoir, so that the service valve device will operate to provide a brake cylinder pressure that will correspond to the magnitude of the differential between brake pipe pressure and volume pressure. For direct release operation, the selector valve is positioned to vent the chamber and connect the auxiliary reservoir to the volume so that the latter will, in effect, become part of said reservoir; whereupon if brake pipe pressure is reduced, pressure fluid will be supplied from the auxiliary reservoir to the brake cylinder until auxiliary reservoir pressure as noted in the volume reduces to substantially the value of brake pipe pressure. The service valve device when in service (brake-applying) position permits pressure fluid to be locally released from the brake pipe via two quick service communications of different flow capacity. When brake cylinder pressure exceeds a chosen value, the more rapid of these communications will be closed by a cut-off valve, but the other communication bypasses the cut-off valve so that a continuous slow-rate quick service reduction in brake pipe pressure will occur whenever and so long as the service valve device is in service position.

Other objects and advantages will become apparent from the following more detailed description of the invention and from the accompanying drawing, wherein the single figure is a diagrammatic view of a brake apparatus embodying the invention.

*Description*

As shown in the drawing, the brake apparatus embodying the invention includes a brake controlling valve device comprising a pipe bracket 1 to faces of which are connected a service portion 2 and an emergency portion 3. To the pipe bracket 1 are suitably connected a branch of a brake pipe 4 adapted to extend from car to car through a train, an auxiliary reservoir 5, an emergency reservoir 6, and a brake cylinder 7.

The service portion 2 comprises a service valve device 8, a combined charging and quick service cut-off valve device 9, a selector valve 10 and a reservoir release valve device 11.

Service valve device 8 comprises two coaxially arranged pistons 12, 13, preferably of the diaphragm-piston type, which are of different effective areas and connected to a common piston stem 14, so as to constitute a fluid pressure motor for a slide valve 15. At opposite sides of larger piston 12 are a chamber 16 open to the brake pipe 4 and a chamber 17 open via a port 18 to a volume 19. At opposite sides of smaller piston 13 are an atmospheric chamber 20 and a chamber 21 that is separated from chamber 17 by a casing partition 22 relative to which the stem 14 is sealingly and axially slidable. Valve 15 is disposed in a recess 23 in the side of stem 14 and is biased by a light helical spring 24 transversely into contact with a flat valve seat formed in the side wall of chamber 17 and is movable longitudinally by and in unison with the motor 12, 13, 14.

A helical spring 25 is preferably provided in chamber 16 to bias the motor 12, 13, 14 and thereby valve 15 to a release position in which it is shown. Two light helical springs 26, 27 are also preferably, though not mandatorily, porvided which act in opposing directions on the motor to tend to bias valve 15 to, and insure stability of said valve, in a lap position that is intermediate its release position and a service position; said springs preferably being suitably caged, by means of spring cages 28, 29 and retaining rings 30, 31, respectively, to limit the extent of their expansion towards each other, such that neither of said springs will be compressed with the valve in lap position and springs 26, 27 will be selectively compressed as said valve is moved from lap position toward service position and release position, respectively. These springs 26, 27, if used, are preferably of equal force and are of less force than spring 25, to assure that valve 15 will be biased to release position when pressures in chambers 16, 17 are equal.

Valve device 9 comprises a cylindrical slide valve 32 coaxially connected to the follower 33 of a flexible diaphragm 34 that separates a chamber 35 from an atmospheric chamber 36. Diaphragm 34 is subject opposingly to pressure of fluid in chamber 35 and to the force of one or both of two concentrically arranged helical bias springs 37, 38 contained in chamber 36. Spring 38 is normally caged by a spring cage 39 that is retained by a retaining ring 40 to limit the extent of its expansion toward follower 33, such that as chamber 35 is charged with pressure fluid, leftward movement of diaphragm 34 and valve 32 will be resisted solely by spring 37 until after a predetermined degree of movement, whereupon further leftward movement will be resisted by both springs 37, 38.

The selector valve 10 may be of the plug or cock type having two separate T-shaped passageways 41, 42 arranged in tandem. Valve 10 is operable by a handle 43 to a graduated release position, in which it is shown. With valve 10 in this position, chamber 21 is disconnected from a vent port 44 and connected via valve passageway 41 to a passage 45, branches of which lead to the seat of slide valve 15, to chamber 35 and to the brake cylinder 7; and the auxiliary reservoir 5 is connected via valve passageway 42 to a passage 47 and is disconnected from a chamber 48 in device 11.

Device 11 comprises two poppet-type valves 49, 50 contained in chambers 48, 51, respectively, and normally seated by respective springs 52, 53 against respective annular valve seat ribs. By tilting a lever 54, and thereby a cam head 55 at one end thereof universally relative to a lever-encircling annular support ledge 56, a pusher member 57 will be shifted axially upward against resistance of a bias spring 58 by said cam head, for causing pusher fingers 59, 60 to unseat valves 49, 50, respectively, for thereby connecting chambers 48, 51 to an atmospheric chamber 61.

The emergency portion 3 of the brake controlling valve device may, for sake of illustration, be of the type fully disclosed in U.S. Patent 2,841,448, granted July 1, 1958 and assigned to the assignee of the present invention. Or, if preferred, the pipe bracket 1 and emergency portion 3 may be identical with those of the "AB" valve fully disclosed in U.S. Patent 2,031,213. For purposes of the present invention, it is important merely to note that chamber 16 of device 8 is connected to the brake pipe 4 via a passage 62 in part provided in portion 3.

*Graduated release operation*

Assume initially that the apparatus is devoid of fluid under pressure and that the selector valve 10 is in graduated release position. Under this condition, all components will be in the respective positions in which they are shown in the drawing.

To initially charge the apparatus, the brake pipe 4 is charged with fluid under pressure at the locomotive in the well-known manner. On a particular car, some of this pressure fluid will flow via a branch of brake pipe 4 and passage 62 to chamber 16 of service valve device 8 and thence via a passage 63 and an elongated annular cavity 64 in slide valve 32 of device 9 to a passage 65 which contains a restriction 66 and is uncovered to chamber 17 by slide valve 15 in release position, for charging the chamber 17 and hence volume 19 to equality with brake pipe pressure at the rate controlled by said restriction. Valve 15 will positively be maintained in release position, whether or not spring 25 is used, because volume pressure in chamber 17 will increase at a slower rate than brake pipe pressure in chamber 16.

Meanwhile, some pressure fluid will also flow from the brake pipe through cavity 64 in slide valve 32 and a restriction 67 and to one branch of passage 47, and thence via valve 10 to auxiliary reservoir 5 for charging the latter to equality with brake pipe pressure at the rate controlled by restriction 67. Some pressure fluid will also flow via another branch of passage 47 to the seating side of a check valve 71 and unseat and flow past said check valve to a passage 72 leading to the emergency reservoir 6 for charging the latter from the auxiliary reservoir and to substantially the normal charge value of brake pipe pressure.

Meanwhile, with service slide valve 15 in release position, a cavity 73 therein will connect a branch of brake cylinder passage 45 with a brake cylinder release passage 74 leading to atmosphere. Since chamber 35 of device 9 is connected to passage 45 and chamber 21 of device 8 is connected to passage 45 by valve 10 in graduated release position, both chambers 35 and 21 and the brake cylinder 7 will be maintained vented via release passage 74 during initial charging.

To effect a brake application, brake pipe pressure is reduced at a rate exceeding the rate at which pressure fluid can backflow from volume 19 into the brake pipe via restriction 66, for thereby creating a differential fluid pressure across piston 12 and thus causing motor 12, 13, 14 to shift against resistance of bias spring 25 and spring 26, if used, and carry valve 15 to a service position. As valve 15 moves toward service position, first the passage 65 is cut off from chamber 17 to prevent backflow of pressure fluid from the volume 19 into the brake pipe and bottle up pressure fluid in the volume at substantially the normal charge value of brake pipe pressure, and the passage 74 is lapped to cut off the brake cylinder 7 from exhaust; and then the valve cavity 73 connects passage 45 to a passage 75 and a passageway 77 in valve 15 connects a restricted passage 78 to a branch of passage 45.

Hence, as soon as service slide valve 15 attains its service position, pressure fluid will commence to flow from the auxiliary reservoir 5 via passage 47 and past a check valve 79 to passage 75 and thence via cavity 73 to passage 45, branches of which lead to the chambers 35 and 21 and to the brake cylinder 7. Meanwhile, pressure fluid will initially flow from the brake pipe 4 via a branch of passage 63 and elongated annular cavity 68 in valve 32 of device 9 to passage 69 and unseat and flow past a check valve 80 to restricted passage 78 and thence via valve passageway 77 and passage 45 to the brake cylinder 7 for causing a relatively rapid rate of quick service reduction in brake pipe pressure as controlled by the selected flow capacity of restricted passage 78. Also, pressure fluid will flow from the brake pipe 4 in by pass of device 9 and via a branch of passage 63 and through a restriction 81 and then unseat and flow past a check valve 82 to passage 75 and thence via passageway 77 and passage 45 to the brake cylinder 7 at a slower rate as determined by the flow capacity of restriction 81.

Meanwhile, when brake cylinder pressure as noted in chambers 35 of device 9 exceeds a preselected low value, such as about 2 p.s.i., diaphragm 34 and its follower 33 will shift against resistance of light spring 37 and carry valve 32 to a charging cut-off position, wherein the follower abuts the cage 39 without effecting compression of the caged heavier spring 38. With valve 32 in this position, passage 65 will be cut off from the brake pipe passage 63 for secondarily or additionally closing the "volume charging communication" 63, 64, 65, 66, 17, 18 whereby the volume 19 is charged from the brake pipe 4, for reasons hereinafter to be explained; and passage 47 will be cut off from brake pipe passage 63 for closing the "auxiliary reservoir charging communication" 63, 64, 67, 47, 42; however, cavity 68 will maintain passages 63, 69 connected so that brake pipe pressure will continue to be locally reduced via the "fast quick service communication" 63, 68, 69, 80, 78, 77, 45, as well as via the "slow quick service communication" 63, 81, 82, 75, 73, 45 that bypasses device 9.

When brake cylinder pressure in chamber 35 exceeds a preselected higher value, such as about 10 p.s.i., the valve 32 will be operatively shifted by diaphragm 34 against the combined resistance of springs 37, 38 to another position, in which it concurrently disconnects passage 63 from passage 69 as well as passages 65, 47 for closing the "fast quick service communication," as well as maintaining the "volume charging communication" and "auxiliary reservoir charging communication" closed.

Meanwhile, as the brake cylinder 7 is charged, fluid at brake cylinder pressure will be supplied to chamber 21 of device 8. When brake cylinder pressure in chamber 21 has increased to a value where it exerts a force, which, when assisted by the bias effects of spring 25 and/or spring 26, if used, slightly exceeds the opposing force exerted on piston 12 by the differential in fluid pressures in chambers 16, 17, the motor 12, 13, 14 will shift valve 15 rightward to a lap position, in which it bottles up pressure fluid in the brake cylinder 7 and closes the "volume charging communication" and "auxiliary reservoir charging communication" and also closes the two "quick service communications" to positively terminate all quick service activity.

If the two springs 26, 27 are used, it will be noted that when the valve 15 attains its lap position, the bias force of spring 26 will have reduced to zero and the bias force of spring 27 will become effective and, by thus causing valve 15 to hesitate in lap position, provide increased stability assuring that the valve will not "overshoot" lap position, when moving from service toward release position.

To release brakes, pressure of fluid in the brake pipe 4 and hence in chamber 16 of device 8 is increased for causing motor 12, 13, 14 to shift valve 15 to release position, in which it is shown; whereupon pressure fluid will be released from the brake cylinder 7 and from chambers 21 and 35 via passage 45, valve cavity 73 and release passage 74. If a graduated or partial release of brakes is desired, brake pipe pressure is increased a degree corresponding to the extent of release of brake cylinder pressure desired; whereupon the valve 15 will be returned to lap position by motor 12, 13, 14 as soon as brake cylinder pressure has reduced to a value corresponding to the magnitude of the reduced differential fluid pressure across piston 12. If a complete release of brakes is desired, the brake pipe is recharged to its normal charge value thereby causing the motor to move valve 15 to and maintain the same in release position for completely venting the brake cylinder 7.

Whenever brake cylinder pressure in chamber 35 of device 9 is reduced to the illustrative 10 p.s.i., springs 37, 38 will operatively shift valve 32 to its charging cut-off position, where it will hesitate (due to the caging of spring 38 by cage 39 and ring 40) until brake cylinder pressure has been reduced low enough (to below 2 p.s.i.) to permit spring 37 to return said valve to a normal position, in which it is shown, and in which it reopens the "volume charging communication" 63, 64, 65, 66, 17, 18 and the "auxiliary reservoir charging communication" 63, 64, 67, 47, 42 via which volume 19 and auxiliary reservoir 5 are respectively charged from the brake pipe 4. It is to be noted that this "volume charging communication" is desirably controlled by both the service valve 15 and cut-off valve 32 so that it will be closed promptly by valve 15 upon movement out of release position during the initial phase of a brake application and not be reopened until, following return of valve 15 to release position, valve 32 is returned to normal position during the final stage of a brake releasing operation. This will assure against depletion of volume pressure by brackflow into the brake pipe during a brake release so that if it should become necessary to reapply brakes before brakes have been completely released and the equipment fully recharged, a given reduction in brake pipe pressure will produce the same degree of braking during such reapplication as if the equipment had been fully recharged, for it will be noted that during graduated release operation brakes are applied according to the magnitude of the differential between volume pressure and brake pipe pressure.

It is to be noted that upon a full service or emergency reduction in brake pipe pressure and in accordance with the usual practice, the service slide valve 15 will be moved to and remain in service position, until brake pipe pressure is restored. Hence, check valve 82 is provided in the "slow quick service communication" to prevent backflow of pressure fluid from the brake cylinder into the brake pipe when the brake pipe is vented during an emergency application of brakes. Check valve 80 also prevents backflow from the brake cylinder into the brake pipe while valve 15 is in service position. Check valve 79 assures that upon recharging of the brake pipe passage 63 during a release of brakes, pressure fluid will not flow from the brake pipe 4 to the auxiliary reservoir 5 and emergency reservoir 6 until valve 32 of device 9 is returned to normal position toward the end of a brake releasing operation; without said check valve, pressure fluid could be supplied to said reservoirs via check valve 82 and in bypass of device 9 as soon as brake pipe pressure exceeded auxiliary reservoir pressure, and this would tend undesirably to delay propagation of a brake pipe pressure increase wave rearward through the train. Check valve 71 assures against backflow of emergency reservoir pressure fluid into the auxiliary reservoir 5 during a brake application, so that emergency reservoir pressure fluid will be supplied to the brake cylinder 7 only by operation of the emergency portion 3 responsively to an emergency rate of reduction in brake pipe pressure.

Thus, when the selector valve 10 is in graduated release position, as above assumed, the service valve device 8 will operate to permit graduated release of brakes, the volume 19 then performing the same purpose as a so-called "control reservoir" heretofore proposed for use with graduated-release type brake controlling valves.

Direct release operation

To condition the apparatus to provide direct release control of brakes, selector valve 10 is operated to a direct release position by moving handle 43 clockwise a quarter of a turn, as viewed in the drawing. With valve 10 in this position, passage 45 will be cut off from chamber 21 and the latter will be vented via passageway 41 and vent port 44; and the auxiliary reservoir 5 will be connected via passageway 42 to passage 47 and also to chamber 48 which is open via a passage 83 to chamber 17. Thus, chamber 21 will remain constantly vented and volume 19 will constantly open to, and thus form part of, the auxiliary reservoir 5.

With valve 10 in direct release position, the reservoirs 5, 6 and chamber 17 and volume 19 will be charged from the brake pipe 4 via the same communications as described in connection with graduated release operation, and device 9 will control cut-off of charging and quick service activity in the same manner as described in connection with graduated release operation. However, the motor 12, 13, 14 of service valve device 8 will be controlled by brake pipe pressure and the bias pressure of spring 25, if used, in chamber 16 acting in opposition to auxiliary reservoir pressure in chamber 17. Hence, upon a chosen reduction (less than that corresponding to a full service reduction) in brake pipe pressure in chamber 16, the motor will shift valve 15 to its previously defined service position for supplying pressure fluid from the auxiliary reservoir 5 to the brake cylinder 7 until auxiliary reservoir pressure as noted in chamber 17 and volume 19 has been reduced substantially to the reduced value of brake pipe pressure; whereupon valve 15 will be shifted to its previously defined lap position for bottling up pressure fluid in the brake cylinder. On the other hand, upon a full service or emergency reduction in brake pipe pressure, valve 15 will move to and remain in service position, the same as during graduated release operation.

In either event, when brake pipe pressure in chamber 16 is increased to or above the existing value of auxiliary reservoir pressure as noted in chamber 17 and volume 19, motor 12, 13, 14 will be shifted against resistance of spring 27, if used, for carrying valve 15 to release position. Valve 15 will remain in release position for effecting a complete release of brakes, irrespective of the rate and degree of subsequent increase in brake pipe pressure, and hence will operate in a manner compatible with that of the well-known "AB" valve to effect a complete release of brakes without requiring a substantially complete restoration of brake pipe pressure.

When brake cylinder pressure in chamber 35 drops below 2 p.s.i., brake pipe pressure fluid will flow to the chamber 17 and to the auxiliary reservoir 5 via the "volume charging communication" 63, 64, 65, 66 and the "auxiliary reservoir charging communication" 63, 64, 67, 47, 42, respectively, which chamber and reservoir are also, of course, then interconnected by way of chamber 48 and valve 10.

It is important to note that, irrespective of whether the valve 10 is in graduated release position or direct release position, the "fast quick service communication" 63, 68, 69, 80, 78, 77, 45 will be opened only during an initial reduction in brake pipe pressure and until brake cylinder pressure has attained a preselected value, such as the illustrative 10 p.s.i.; and that the "slow quick service communication" 63, 81, 82, 75, 73, 45 constitutes a continuous quick service communication which is opened whenever and so long as the service slide valve 15 is in service position, to locally reduce brake pipe pressure and help propagate the brake pipe pressure reduction wave rearward through the train to cause brakes to be applied more promptly through the train.

Manual release of reservoir pressure

If the car is parked on a siding with the brake pipe 4 vented, the service valve 15 will be in service position and hence maintain the auxiliary reservoir 5 connected to the brake cylinder 7.

For purposes of the present invention, it is important merely to note that chamber 48 of release valve device 11 is connected via passage 83 and chamber 17 to volume 19; that the motor 12, 13, 14 of device 8 is always controlled by pressure of fluid in volume 19 and chamber 17; that said volume serves the function of a so-called "control reservoir" of the prior art or serves as part of the auxiliary reservoir 5 according to whether the selector valve 10 is in graduated release position or in direct release position, respectively; and that said valve 49 thus, in effect, vents a "control reservoir" or the auxiliary reservoir according to the positioning of valve 10.

Valve 50 controls venting of emergency reservoir 6 which is always connected to chamber 53 via a branch of passage 72. Thus, in the case where selector valve 10 is in graduated release position and valve 49 controls venting of the "control reservoir" volume 19 but not of the auxiliary reservoir 5, it will be apparent that upon unseating of valve 50 pressure fluid will be released not only from the emergency reservoir 6 but also from the auxiliary reservoir 5 via selector valve passageway 42, passage 47, check valve 71, and emergency reservoir passage 72.

Pusher finger 60 is preferably shorter than finger 59 so that upon a slight degree of upward movement valve 49 will be unseated for venting volume 19 and upon a greater degree of upward movement valve 50 will be unseated for venting the emergency reservoir 6. This will permit pressure fluid to be maintained bottled up in the emergency reservoir if venting of only the volume 19 is desired.

Having now described the invention, what I claim as new and desire to secure by Letters Patent is:

1. In a fluid pressure brake apparatus of the type comprising a brake pipe, a brake cylinder, an auxiliary reservoir, and a volume charged with pressure fluid from the brake pipe, the combination of service valve means controlled by brake pipe pressure and pressure of fluid in a chamber acting in opposition to pressure of fluid in the volume and operative responsively to a reduction in brake pipe pressure to a service position to effect supply of pressure fluid from the reservoir to the brake cylinder and responsive to a subsequent increase in brake pipe pressure to a release position to effect release of pressure fluid from the brake cylinder, and having a lap position in which pressure fluid is bottled up in the brake cylinder, and selector valve means operable selectively to a direct release position to connect the chamber to a vent and connect the volume to the reservoir and to a graduated release position to disestablish such connections and connect the chamber to the brake cylinder, such that with said selector valve means in direct release position said service valve means will assume its lap position when volume pressure reduces to substantially the existing reduced value of brake pipe pressure and will be moved to and remain in release position upon a subsequent increase in brake pipe pressure for effecting a complete release of brakes provided such increase in brake pipe pressure exceeds a slight degree, and such that with said selector valve means in graduated release position said service valve means will assume its lap position whenever brake cylinder pressure corresponds substantially to the magnitude of the differential between brake pipe pressure and volume pressure for thereby permitting brakes to be graduated off according to the degree brake pipe pressure is restored toward the value of volume pressure, and means, including said service valve means and a restriction, defining a quick service communication via which pressure fluid may be locally released from the brake pipe at a restricted rate to cause a local quick service reduction in brake pipe pressure, and wherein said communication is opened by said service valve means in service position and closed thereby in lap position and release position, for thereby effecting such quick service reduction continuously whenever and so long as said service valve means is in service position.

2. In a brake apparatus according to claim 1, means, including said service valve means and respective flow-restricting means, defining separate quick service communications of different flow capacities via which pressure fluid may be locally released from the brake pipe at respective restricted rates, the one of said communications of larger flow capacity also including a cut-off valve means controlled by brake cylinder pressure and arranged in series with said service valve means, said service valve means being operative in service position to permit flow of brake pipe pressure fluid through both of said communications and operative in lap position and release position to close both of said communications, and said cut-off valve means being operative to permit or prevent flow through said one communication according to whether brake cylinder pressure respectively is less than or exceeds a preselected value, whereby brake pipe pressure fluid will be rapidly released initially via both of said communications when said service valve means moves to service position to initiate a brake application and then will be released more slowly solely via said other communication after brake cylinder pressure exceeds said preselected value and until said service valve means moves to lap position.

3. A fluid pressure brake according to claim 2, wherein each of said communications leads from the brake pipe to the brake cylinder, and each includes a check valve preventing flow from the brake cylinder to the brake pipe.

4. In a fluid pressure brake apparatus of the type comprising a brake pipe, a brake cylinder, a reservoir charged from the brake pipe, and a volume separate from the reservoir, the combination of a fluid pressure motor comprising means subject to brake pipe pressure and brake cylinder pressure acting in opposition to volume pressure, service valve means operably connected to said motor, other valve means subject to brake cylinder pressure acting in opposition to pressure of a light bias spring and also after a predetermined movement to pressure of a heavier bias spring, a charging communication including said other valve means and service valve means and a restriction via which pressure fluid can flow between the brake pipe and volume at a restricted rate, one quick service communication including said other valve means and a restriction and said service valve means via which pressure fluid may be locally released from the brake pipe at a relatively fast rate, another quick service communication including a restriction and said service valve means via which pressure fluid can be locally released from the brake pipe at a slower rate, said service valve means being operative responsively to an increase in brake pipe pressure to a release position in which it connects the brake cylinder to a release communication and permits flow through said charging communication and closes both of said quick service communications, and responsively to a reduction in brake pipe pressure to a service position in which it closes said charging communication and permits flow of pressure fluid through both of said quick service communications and from the reservoir to the brake cylinder, said service valve means being operative to a lap position in which it closes all of said communications when brake cylinder pressure corresponds substantially to a predetermined proportion of the existing differential between brake pipe pressure and volume pressure, said other valve means being operative to permit or prevent flow of pressure fluid through said charging communication and one quick service communication according to whether brake cylinder pressure is less than a preselected low value or greater than a preselected higher value, respectively, and operative to permit flow through said one quick service communication but not said charging communication when brake cylinder pressure is between said values.

5. In a brake apparatus according to claim 4, another charging communication including said other valve means and a restriction via which pressure fluid may flow between the brake pipe and reservoir at a restricted rate, and wherein said other charging communication is closed by said other valve means when brake cylinder pressure exceeds said preselected low value.

6. In a brake apparatus according to claim 4, a pair of light springs of equal force operatively exerting opposing forces in said service valve means to bias it to its lap position, and a pair of means each for selectively caging a respective one of said light springs during movement of the service valve means from lap position toward service position and release position, respectively, thereby to increase stability of said service valve means in lap position.

References Cited in the file of this patent

UNITED STATES PATENTS

| | | |
|---|---|---|
| 1,159,434 | Turner | Nov. 9, 1915 |
| 2,058,012 | Guillemin-Tarayre | Oct. 20, 1936 |
| 2,156,720 | Campbell | May 2, 1939 |
| 2,829,010 | McClure | Apr. 1, 1958 |
| 2,858,168 | Cook et al. | Oct. 28, 1958 |
| 2,858,170 | McClure et al. | Oct. 28, 1958 |